C. F. SCHNUCK.
CLUTCH.
APPLICATION FILED MAR. 15, 1916.
1,303,503.
Patented May 13, 1919.
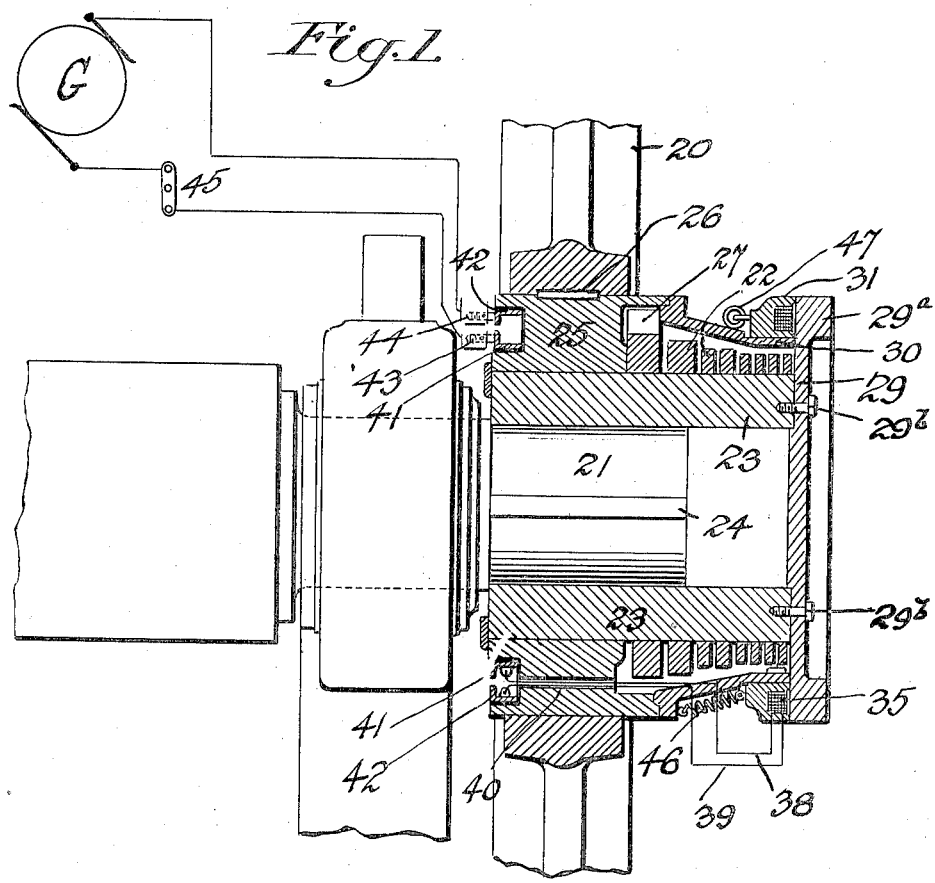
Fig. 1.
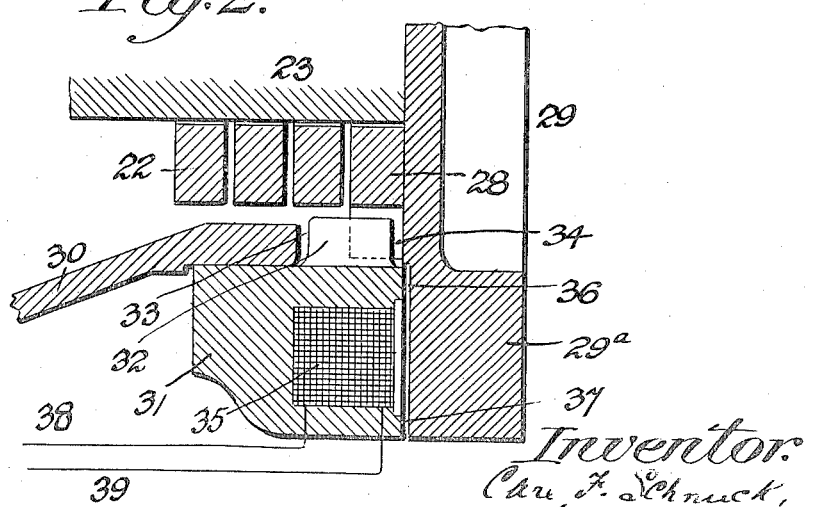
Fig. 2.
Inventor.
Carl F. Schnuck,
his attorney.

UNITED STATES PATENT OFFICE.

CARL F. SCHNUCK, OF ANSONIA, CONNECTICUT, ASSIGNOR TO FARREL FOUNDRY & MACHINE COMPANY, OF ANSONIA, CONNECTICUT, A CORPORATION OF CONNECTICUT.

CLUTCH.

1,303,503. Specification of Letters Patent. Patented May 13, 1919.

Original application filed September 15, 1914, Serial No. 861,825. Divided and this application filed March 15, 1916. Serial No. 84,468.

*To all whom it may concern:*

Be it known that I, CARL F. SCHNUCK, a citizen of the United States, residing in Ansonia, county of New Haven, and State of Connecticut, have invented certain new and useful Improvements in Clutches, of which the following is a full, clear, and exact description.

This invention relates to clutches, and more particularly to electromagnetically controlled coil clutches of the general type described in my Patent No. 1,208,842, of which the present application is a division. Clutches of the type in question are particularly adapted for connecting electric and other prime movers to heavy machinery, such as rubber mills, rolling mills, crushing and stamping machinery and the like.

One of the primary objects of the present invention is to provide an electromagnetically controlled coil clutch which is of very simple, compact construction, and which is reliable and efficient in operation.

Another object of the invention is to provide improved means for mounting an electromagnet in a clutch of the type indicated, so that it will effectively retard the tail portion of the rotating friction coil when the current is turned on, and thereby couple together the driving and driven members.

The invention also aims to improve the general construction and operation of devices of the class to which the invention relates.

To these and other ends, the invention consists in the novel features and combinations of parts to be hereinafter described and claimed.

In the drawing, —

Figure 1 is a central longitudinal section of a clutch embodying my improvements, showing the parts in the engaged position; and Fig. 2 is an enlarged detail of certain parts shown in Fig. 1, showing them in the disengaged or "off" position.

Referring to the drawing, I have shown my improvements applied to a clutch for coupling a continuously rotating gear wheel or pulley 20 to a driven shaft 21, but this is not an essential feature. I have also shown my improvements applied to a clutch wherein the continuously rotating member, such as the gear wheel or pulley 20, carries the helical friction coil 22, which rotates therewith, and is adapted to be brought into frictional contact with a drum or similar member 23 fixed to the driven member 21, but obviously a reversal of the several parts would be within the scope of my invention.

The drum 23 is fixed non-rotatively to the driven shaft 21 by means such as a key or feather 24. Surrounding the drum at one end and bearing thereon is a driving plate 25, to which one end of the coil 22 is fixed. The coil 22 is so arranged as to surround that portion of the drum which is not surrounded by the driving plate 25. This plate is fixed to the gear or pulley 20 by means of a key or feather 26, so that as the gear is rotated it carries the driving plate 25 with it, and said plate in turn carries the coil which, when the parts are in the disengaged position, turns about the drum with a certain amount of clearance. That part of the friction coil 22 which is connected to the driving plate 25 is called the head of the coil, and this so-called head, which is indicated at 27, is interlocked with the driving plate in any appropriate manner. By preference, the head of the coil carries a lug which fits into a notch of the driving plate, but as this means of connection is well known in the art, I have not considered it necessary to refer to it in further detail. The free end or tail of the coil is shown at 28, and the coil is engaged with the drum by shifting the tail in such a direction relatively to the body of the coil as to wind up the coil to a certain extent, and thereby cause it to bind frictionally against the smooth outer surface of the drum. By winding up the coil, it is tightly clamped on the drum so that the latter partakes of the rotation of the coil, and the drum in turn rotates the driven shaft 21 to which it is fixed. In the particular form shown, the pulley, driving plate and coil rotate in a clockwise direction, as viewed from the righthand end of the clutch, in Fig. 1, and the coil is wound in the opposite direction from the head to the tail. In other words, in the example shown, the direction of rotation of the driving plate is clockwise, as viewed from the righthand end of the coil, and the direction of wind of the coil from the head to the tail is counterclockwise. By preference, the coil 22 diminishes in cross-sectional area from the head to the tail, so that when the tail is suitably manipulated to wind or tighten the coil, the latter will grip the drum in a gradual manner, and thus cause the gradual engagement of the clutch so as to avoid shock or jarring.

In the example shown, the clutch coil is tightened by means of an auxiliary clutch which locks the tail of the coil to the driven part. This auxiliary clutch is operated by an electromagnet, and the construction is preferably as follows: The drum 23 has secured to the end thereof a disk or plate 29 of soft dynamo steel. This plate forms the end of the clutch casing, inasmuch as it closes the open end of a shell 30 surrounding the friction coil. The shell 30 is adapted to rotate in close proximity to the plate 29. A ring or tail plate 31 surrounds the sheel 30 and rests thereon adjacent the tail portion of the coil, said ring or plate being capable of axial movement as well as turning movement relatively to the casing. This ring or plate 31 is interlocked with the tail of the coil by means such as a lug 32 on the ring which extends through a clearance opening 33 in the casing into engagement with an outturned lug 34 on the tail of the coil, as shown in Fig. 2. The ring 31 carries an annular magnet coil 35, which is preferably fitted in an annular groove in said ring; and the ring has friction surfaces 36, 37 on opposite sides of the groove to coöperate with opposing portions of the plate 29 which has a thickened rim portion 29ª in proximity to and opposing the magnet ring. The plate 29 is attached to the drum by bolts 29ᵇ.

The magnet coil 35 is connected with a source of electric current, such as a dynamo G, by means similar to those shown in the parent Patent No. 1,208,842. The magnet is connected to leads 38, 39, which in the form shown pass through the casing and through a duct or passage 40 in the driving plate. At the opposite side of the rotary driving plate, these leads 38, 39 are connected to slip rings 41, 42 respectively fixed to the driving plate. These slip rings are suitably insulated from each other, and a fixed brush 43 bearing against the ring 41 is connected to one pole of the dynamo G, while a similar fixed brush 44 bearing on the ring 42 is connected to the other pole of the dynamo. A switch 45 interposed in a circuit enables the latter to be closed or opened as desired. When the switch has been closed, electrical connection between the magnet coil 35 and the current source is maintained, irrespective of the rotation of the magnet coil, by reason of the permanent contact of the brushes with the slip rings.

In the form shown, a spring or springs 46 tend to hold the ring or tail plate 31 away from the coöperating plate 29, and a spring or springs 47 connect the tail plate with the casing in such a manner as to hold said parts normally in a definite angular relation.

When the circuit is closed, the tail plate 31 is moved axially to contact with the coöperating portion of the plate 29, which serves as a fixed armature. In other words, when the magnet is energized, it moves toward and into contact with the fixed armature. The friction surfaces 36, 37 grip the coöperating surfaces on the armature or end plate, due to the magnetic attraction of the magnet and armature, and the tail plate is thereby locked to the stationary or slowly moving driven member of the clutch. This arrests the tail plate and drags back or retards the tail of the clutch coil 22, thereby winding the coil from the free end, and causing it to tightly engage the drum. In this manner, the driving and driven parts are tightly coupled together, and they remain in this condition as long as the circuit is closed, and the magnet is energized. When the magnet is deënergized by opening the circuit, the spring or springs 46 strip the tail plate from the fixed armature plate so as to release the members of the auxiliary clutch, whereby the friction coil is disengaged from the drum. The movement of the driven shaft will then be arrested. The release of the friction coil from the drum is expedited by the spring 47, which has an unwinding effect on the friction coil, as it returns the tail plate to the initial angular position relatively to the casing member 30.

It will be obvious that the plate 29 serves as a fixed armature which is secured to or forms a part of the driven member, while the ring 31 provides a magnet field movable axially of the armature into and out of coöperation therewith, the movable part of the magnet structure being connected with the clutch coil. By this arrangement, the construction of the clutch is made very simple and compact. The device operates very efficiently with a very low consumption of current, and owing to its strong construction and comparatively few parts, the clutch when properly constructed and adjusted may be maintained in active service for a long period of time without requiring any particular attention on the part of the attendant.

Various changes in the details of the construction may be made without departing from the scope of my invention as defined in the claims.

I do not claim broadly herein the combination of driving and driven members, one of which comprises a drum, a friction coil surrounding the drum and having a thick head portion and a thin tail portion, means for securing the head portion of the coil to the other clutch member, a tail plate engaging the tail portion of the coil, a casing member guiding said tail plate for turning movement, and an electromagnet for locking the tail plate to the drum, having one part carried by the drum, and the other part carried by the tail plate, as claimed in my Patent No. 1,208,842.

What I claim is:—

1. In a coil clutch, the combination of driving and driven members, a friction coil attached to one member and embracing the other member, a plate rigid with such other member, and electromagnetic means for locking one end portion of said friction coil to said plate to tighten said coil; substantially as described.

2. In a coil clutch, the combination of driving and driven members, a friction coil attached to one member and embracing the other, a third member rigid with the member embraced by the coil and extending into proximity to the free end of the friction coil, and electromagnetic means for locking one end portion of said friction coil to said third member; substantially as described.

3. In a coil clutch, the combination of driving and driven members, a friction coil attached at one end to one of said members and embracing the other member, a plate rigidly attached to the member embraced by said coil, an electromagnet for clamping said coil to said plate, and a source of current in circuit with said magnet; substantially as described.

4. In a coil clutch, the combination of driving and driven members, a friction coil attached at one end to one of said members and embracing the other member, an end plate, bolts for securing said end plate to such other member adjacent the free end of the friction coil substantially at right angles to the axis of such friction coil, and an electromagnetic means for clamping said friction coil to said end plate; substantially as described.

5. In a coil clutch, the combination of driving and driven members, one of which comprises a drum, a friction coil attached to the other member and embracing said drum, an end plate fixed to said drum and extending across the end of the coil, and electromagnetic means for locking such free end of the friction coil to said end plate; substantially as described.

6. In a coil clutch, the combination of driving and driven members, one of said members comprising a drum, a friction coil attached to the other member and embracing said drum, an end plate fixed to said drum and of greater diameter than the latter, and a relatively movable electromagnetic element connected to the end of the friction coil adapted to grip said end plate; substantially as described.

7. In a coil clutch, the combination of driving and driven members, one of said members comprising a drum, a friction coil attached to the other member and embracing said drum, a tail plate connected with the free end of the friction coil, an end plate fixed to said drum, and electromagnetic means for clamping said tail plate to said end plate; substantially as described.

8. In a coil clutch, the combination of driving and driven members, one of said members comprising a drum, a friction coil surrounding said drum and connected at one end with the other member, a tail plate connected with the free end or tail of said coil, and carrying a magnet coil, means mounting said tail plate for axial and turning movements, and a fixed armature member secured to said drum and coöperating with said tail plate; substantially as described.

9. In a coil clutch, the combination of driving and driven members, one of said members comprising a drum, a friction coil surrounding said drum and secured to the other member, a tail plate secured to the free end of said friction coil and carrying a magnet coil, a casing member supporting said tail plate for axial and turning movements, and an end plate secured to said drum and presenting a fixed armature member; substantially as described.

10. In a coil clutch, the combination of driving and driven members, a friction coil connected with the driving member and surrounding the driven member, a plate connected with the free end of said friction coil, and an electromagnet for locking said plate to the driven member, comprising a magnet coil mounted on said plate and an armature plate fixed to said driven member; substantially as described.

11. In a coil clutch, the combination of driving and driven members, a friction coil fixed at one end to one of said members and embracing the other, a casing member carried by one of said first-named members, a tail plate surrounding said casing member and connected with the free end or tail of the coil, and means for fixing said tail plate rigidly with respect to the member surrounded by said coil to thereby tighten said coil; substantially as described.

12. In a coil clutch, a driving member, a driven member, one of said members comprising a drum, a friction coil attached to the other member and embracing said drum, an electromagnet structure for locking one end of said coil to said drum to thereby tighten said coil, comprising an armature member formed as a plate, and means coöperating with said plate to inclose the clutch coil; substantially as described.

13. In a coil clutch, driving and driven members, one of said members comprising a drum, a friction coil attached to the other member and embracing said drum, an open ended shell inclosing said friction coil, and an electromagnet structure for locking the free end portion of said friction coil to said drum to thereby wind said coil, comprising a member closing the open end of said shell; substantially as described.

14. In a coil clutch, the combination of driving and driven members, a friction coil attached to one of said members and embracing the other member, a shell inclosing the friction coil but open at one end, and an electromagnet for locking one end of said friction coil to the member embraced thereby to tighten said coil, said electromagnet including an armature plate closing the open end of the shell; substantially as described.

15. In a coil clutch, the combination of driving and driven members, one of said members comprising a drum, a friction coil surrounding the drum and attached to the other member, a casing member or shell attached to such other member around the friction coil, a plate fixed to the end of the drum and constituting a member of the casing, and means for engaging the coil with the drum; substantially as described.

16. In a coil clutch, the combination of a driving member, a driven member, one of said members comprising a drum, a friction coil attached to the other member and embracing said drum, a casing comprising a shell inclosing said friction coil carried by the member to which said coil is secured, and a separate end plate for said shell fixed to said drum, and a magnet structure for locking the free end of the friction coil to said drum, including said end plate as a part thereof; substantially as described.

17. In a coil clutch, the combination of a driving member, a driven member, one of said members comprising a drum, a friction coil attached to the other member, and embracing said drum, an auxiliary clutch member rigidly fixed to the end of the drum, a second auxiliary clutch member at the free end of the friction coil, and electromagnetic means for interengaging the auxiliary clutch members; substantially as described.

18. In a coil clutch, the combination of a driving member, a driven member, one of said members comprising a drum, a friction coil attached to the other member and embracing the drum, a tail plate secured to the free end of the friction coil, an electromagnet coil rigidly carried by the tail plate, and an armature for said electromagnet coil rigid with the end of the drum; substantially as described.

19. In a coil clutch, the combination of driving and driven members, a friction coil having a thick head portion attached to the driving member, and a free tail portion of less cross-sectional area than said head portion, said coil embracing the driven member, a casing member carried by and rotatable with said driving member and inclosing said coil, a second casing member fixed to the end of the driven member and closing one end of said first casing member, and an electromagnet for locking the tail portion of the coil to said driven member having a magnet and an armature, one of said last-named parts connected with the tail portion of the coil and the other part rigid with the driven member; substantially as described.

20. In a coil clutch, the combination of driving and driven members, a friction coil surrounding the driven member and secured to the driving member, a casing for the coil, and an electromagnet for locking the free end of the coil to the driven member, comprising relatively movable armature and magnet-coil-carrying members, one of said last named members rigid with the driven member, and the other member rotatably mounted on the casing and connected with the end of the friction coil; substantially as described.

21. In a coil clutch, the combination of driving and driven members, one of said members in the form of a cylinder or drum, and the other member embracing said cylinder or drum, a friction coil surrounding a portion of said cylinder or drum alongside said outer member and attached to said outer member, an inclosing shell for said friction coil carried by the outer clutch member, an end plate for said shell serving as an auxiliary clutch member, a coöperating auxiliary clutch member associated with the free end of said friction coil, and means for interengaging the auxiliary clutch members; substantially as described.

22. In a coil clutch, the combination of driving and driven members, one of said members comprising a drum, a friction coil connected at one end with the other member and surrounding said drum, said friction coil having a lug at its free end or tail, a tail plate engaging said lug, a casing member surrounded by said tail plate and on which the same is guided for rotation, and means for locking the tail plate to the drum, to wind the coil; substantially as described.

23. In a coil clutch, the combination of driving and driven members, a friction coil attached at one end to one of said members, and embracing the other member, a tail plate engaging the free end of said friction coil, a casing member on which said tail plate is guided, and electromagnetic means for locking said tail plate to the member embraced by said friction coil, said means including an end plate fixed to said last-named member; substantially as described.

24. In a coil clutch, the combination of driving and driven members, one of which comprises a drum, a friction coil attached to the other member and embracing said drum, an end plate fixed to said drum, and electrically controlled means for locking the free end of said coil to said end plate to thereby tighten said coil on said drum; substantially as described.

25. In a coil clutch, the combination of driving and driven members, one of which comprises a drum, a friction coil attached at one end to the other member and embracing said drum, an end plate rigid with the drum, and electromagnetic means for locking the free end of said friction coil to said end plate to thereby tighten said coil on said drum; substantially as described.

26. In a coil clutch, driving and driven members, one of which comprises a drum, a friction coil attached to the other member and embracing said drum, said friction coil having a free end, a plate rigidly fixed to said drum in line with the free end of said coil, and a magnet structure for locking the free end of said coil to said plate; substantially as described.

27. In a coil clutch, driving and driven members, one of which comprises a drum, a friction coil attached at one end to the driving member and embracing said drum, a member rigidly attached to said drum in line with the free end of said friction coil, and a magnet structure including said member as a part thereof for tightening the coil on said drum; substantially as described.

28. In a coil clutch, driving and driven members, one of which comprises a drum, a friction coil attached at one end to the other member and embracing said drum, an auxiliary clutch member rigidly attached to the drum, a second auxiliary clutch member at the free end of the friction coil, and electromagnetic means for interengaging the auxiliary clutch members; substantially as described.

29. In a coil clutch, driving and driven members, one of which comprises a drum, a friction coil attached at one end to the other member and embracing said drum, an auxiliary clutch member bolted to the end of the drum, a second auxiliary clutch member at the free end of the friction coil, and electromagnetic means for interengaging the auxiliary clutch members; substantially as described.

In witness whereof, I have hereunto set my hand on the 13th day of March, 1916.

CARL F. SCHNUCK.